L. S. Sisson,
Comb Frame.

No. 110,937.   Patented Jan. 10, 1871.

Witnesses:
Chas Jacobs
A. V. White

Inventor:
L. S. Sisson
per
T. H. Alexander
Atty.

United States Patent Office.

LUTHER S. SISSON, OF WEST EDMESTON, NEW YORK.

Letters Patent No. 110,937, dated January 10, 1871.

IMPROVEMENT IN BEE-HIVES.

The Schedule referred to in these Letters Patent and making part of the same.

*To all whom it may concern:*

Be it known that I, LUTHER S. SISSON, of West Edmeston, in the county of Otsego and State of New York, have invented certain new and useful Improvements in Bee-Hives; and I do hereby declare that the following is a full, clear, and exact description thereof, reference being had to the accompanying drawings and to the letters of reference marked thereon which form part of this specification.

The nature of my invention consists in the construction and arrangement of a "bee-hive," as will be hereinafter fully set forth.

In order to enable others skilled in the art to which my invention appertains to make and use the same, I will now proceed to describe its construction and operation, referring to the annexed drawings, in which—

Figure 1:
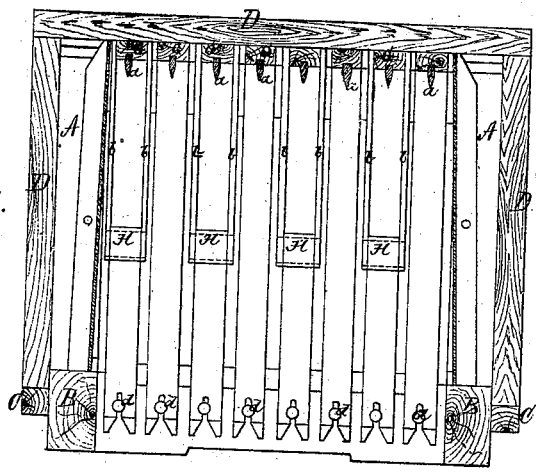
Figure 2:
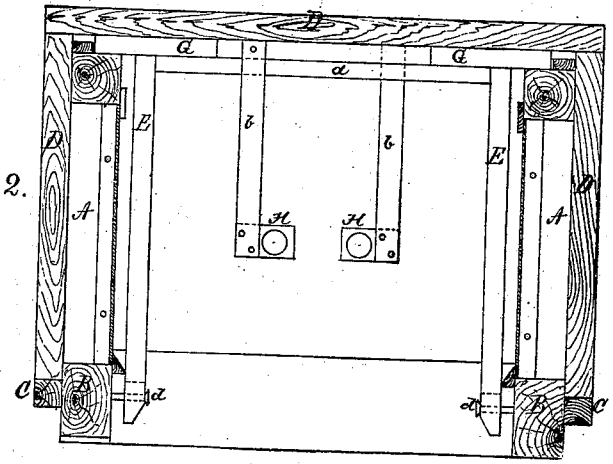

Figure 1 is a longitudinal vertical section, and
Figure 2 is a transverse vertical section of the bee-hive.

The frame of my hive is composed of four corner-posts, A A, connected at their lower ends by slats or boards B B, through one of which an opening is cut, to form the entrance for the bees.

The upper ends of the corner-posts are also connected on the front and rear sides in such a manner as to form a convenient support upon which to rest the comb frames.

The sides and ends of the frame thus formed are provided with glass, making it very convenient to observe the bees and frames of honey.

If desired, the ends may be closed with boards, and only the sides provided with glass.

Around the lower end of the frame, on the slats B B, are placed cleats C C, upon which the cover D rests.

The comb-frames are each composed of a top-piece, G, with two side pieces, E E, running perpendicularly downward from near the ends of the top piece G, said top piece extending beyond the end pieces, so as to rest upon the main frame.

In the under side of the top piece G is made a longitudinal groove, in which is inserted a V-shaped flange, $a$, which projects downward, forming the comb-guide.

The sides of the top piece G are also cut out, as shown, to form a passage for the bees, and on each side of this cut-out portion of the top piece is secured a bar, $b$, which extends downward about half the distance to the bottom of the hive.

Between the lower ends of the two bars $b\ b$ of each comb-frame is secured a block, H, having a horizontal hole through it for the bees to pass from one sheet of comb to the other.

This block always forms a winter passage for the bees to get to their honey, without going under or around a sheet, which they could not do in very cold weather without perishing with the cold; also, a convenient passage for the queen in brooding season.

The thin bars $b\ b$, by which said block is attached to the upper part of the frame, serve as guides to cause the bees to build their combs straight, as they will commence their combs on the guides $a\ a$.

The bottom of the comb-frame is supported as shown by bolts or screws $d\ d$ inserted in the side pieces B B, and the ends of sides E E of the comb-frame being notched and slotted, so as to fit over said bolts or screws.

It will be observed that the comb-frames are made without any cross-pieces except the top, thereby enabling any one to see the bees from the bottom of the hive as readily as in the old box hive.

Having thus fully described my invention,
What I claim as new, and desire to secure by Letters Patent, is—

The comb-frames G E, constructed as herein described, that is, the top bars G, being cut out to form a passage for the bees, and grooved for the insertion of the comb-guide $a$, and the side pieces E E notched at their lower ends to fit over the screws $d\ d$, the said top bar of each frame being further provided with a downward-projecting vertical bar $b$, having at its lower end the perforated block H, and all the frames inclosed within the hive composed of the connected corner-posts A A with glass sides, cleats C C and cover D, all as herein set forth.

In testimony that I claim the foregoing as my own I affix my signature in presence of two witnesses.

L. S. SISSON.

Witnesses:
J. V. WHITE,
J. W. MESTER.